UNITED STATES PATENT OFFICE 1,932,434

CHEMICAL SALTS

Joseph A. Wyler, Allentown, Pa., assignor to Trojan Powder Company, a corporation of New York No Drawing. Application July 26, 1932
Serial No. 624,905

4 Claims. (Cl. 23—243)

My invention relates to improved means for treating chemical salts to prevent them from "caking" or "setting", and more particularly relates to improved means for treating ammonium compounds and other salts for the purpose of obtaining material which will resist "caking" or "setting" for a long period of time and over a wide range of conditions as to density of packing, moisture and temperature. The principal object of my invention is to provide a treatment for ammonium nitrate as a result of which ammonium nitrate may be stored for long periods of time without setting, the treated ammonium nitrate after being admixed with other materials employed in the formulation of fertilizers, explosives, or other mixtures being capable of being transported and stored for long periods of time without deterioration or reduction of its desirable characteristics, and without showing any tendency to harden, cake, or set.

It is well known that at certain temperatures ammonium nitrate changes its crystalline condition, and that in passing through such transition points or transition temperatures the ammonium nitrate tends, as a result of changes incident to such change in crystalline form, to become aggregated to form hardened masses. Finely pulverulent ammonium nitrate even when packed relatively loosely into a container, tends to change into a hard porous but solid mass by exposure to a temperature of 100° F. for from two to twenty-four hours depending on the moisture content of the material, and this tendency to harden, cake or set is well known to be increased by increased time of exposure to an elevated temperature, and particularly temperatures higher than 100° F., and to be materially modified at times by such factors as changes in the moisture content of the material, the humidity of the air in contact with the material, the density of packing of the material and other like factors. In addition to the tendency of ammonium nitrate to undergo inter-crystalline changes at certain definite temperatures, corresponding to transition points between its different crystalline modifications, it also undergoes changes which take place even when the material is maintained at a temperature range intermediate between its transition temperatures, and which appear to be due to crystal growth as a result of inter-action between ammonium nitrate and such small amounts of moisture as are always present in the commercial material, this crystal growth causing a "cementing" action which after a lapse of time is capable of transforming a pulverulent mass of free flowing crystals of ammonium nitrate into a solid rigid mass of adhering or cemented crystals.

This tendency of ammonium nitrate to cake from the effects of either moisture content or of temperature change and particularly from the joint effects of these two cooperating influences has long been known, and has long been recognized to form one of the principal drawbacks in the use of ammonium nitrate in explosives and in the use of ammonium nitrate explosives in mining and quarrying work. It is also of great significance in the use of ammonium nitrate in high concentrations in fertilizers, where "setting" of the mass is a disadvantage. Explosives containing a high percentage of ammonium nitrate may be carefully made, and may be found to be in perfect condition after manufacture, but as a result of transportation in an ordinary freight car on a warm and sunny day, or as a result of storage for only a few hours in a warm magazine, these explosives may acquire so strong a "set" as to be rigid and unyielding in the hands, and to be very difficult to use, because of their rigidity preventing the insertion of a priming means, and making the insertion of such detonator, electric detonator, or other priming agent difficult and more hazardous than would be the case if the explosive were in its normal pulverulent or "soft" condition.

As these facts have long been known, many investigators have struggled with the problem of obtaining a non-setting ammonium nitrate. Many treating and coating agents have been employed, and many ingenious methods have been proposed for attacking the problem, but up to the present time these methods have at most yielded ammonium nitrate of reduced tendency to set, but have not given non-setting ammonium nitrate, either when the ammonium nitrate is considered alone or when considered as a component of a fertilizer or an explosive mixture of high nitrate of ammonia content.

I have discovered that when ammonium nitrate is treated under certain conditions as will now be described with sodium silicate either alone or admixed with other materials, a very remarkable inhibiting action on the coalescence or "caking" or "setting" of ammonium nitrate occurs, and although I have not been able to discover the exact cause of this inhibiting action, I have discovered conditions under which the "caking" or "setting" of ammonium nitrate may be entirely prevented through a considerable temperature range, and may be considerably reduced over an additional temperature range.

In order that my invention may be more fully understood I wish to point out that the "setting" or "caking" of ammonium nitrate appears to be a very complicated time-temperature reaction, the complicating factor being that the effect of temperature is not the same at different points on the temperature scale but, on the contrary, is of great intensity within certain temperature ranges corresponding to certain known transition temperatures in the crystalline condition of ammonium nitrate, and is of relatively much less intensity at certain other temperature ranges located between the known transition temperatures of the different types of ammonium nitrate crystals. In general ammonium nitrate tends to "cake" or "set" to a greater extent with increasing time, and to an increasing extent with higher temperatures, but the time-temperature relationship is extremely complicated and often appears highly erratic, although it cannot be doubted that the physical changes which cause "caking" or "setting" are entirely definite in their nature, and that accordingly the apparent erratic behavior is really due to uncontrolled variables in the conditions under which the tests are made.

As an example of one form of my present invention I may take 2000 pounds of ammonium nitrate in the form of commercial crystalline material and to this I add 270 pounds of water. The mixture may conveniently be made in a steam-jacketed kettle provided with rotatable stirrer arms, and the mixture is then heated and stirred until a temperature of 145° C. to 150° C. is reached. The heating should then be discontinued and the temperature of the mixture allowed to drop until a temperature of 130° C. has been reached. To the solution of ammonium nitrate is then added a mixture of 20 pounds of commercial sodium silicate and 20 pounds of water, the stirring of the mixture being preferably continued during and after the addition of the sodium silicate solution, and after all of the sodium silicate solution has been added the mixture is gently heated, preferably by the use of steam at a pressure of 5 lbs. per square inch in the heating coils, to remove the water present. As soon as a fairly dry salt is present in the kettle the supply of steam is shut off, and the salt is stirred as it cools until it reaches room temperature.

The product obtained is a pulverulent mass which differs greatly from ordinary nitrate of ammonia in its resistance to caking when exposed to unfavorable conditions of temperature and moisture.

Although in the above example the conditions of temperature, concentration and stirring, and the amount of sodium silicate solution used all represent the conditions which I have found most satisfactory in the practice of my invention, it should be remembered that my invention is not limited in any way to the employment of the quantities and temperatures named, and my invention broadly covers the use of sodium silicate as a means of preventing the "setting" or "caking" of ammonium nitrate, without any specific limitation as to the amount of sodium silicate used or the temperatures employed during the evaporation and crystallizing of the mixture of ammonium nitrate and sodium silicate.

Although I do not wish the scope of my invention to be limited by any theory which I may hold as to the reason for the efficacy of the principles of treatment which I have discovered, it is my belief that during the crystallization of a solution containing both ammonium nitrate and sodium silicate, when present in such proportion that there is a great preponderance of ammonium nitrate present, this material tends to crystallize under conditions of concentration which are unfavorable to the separation of sodium silicate from the solution, and the crystals of ammonium nitrate which separate continue to grow with further evaporation of the liquid until the water present in the solution has been almost completely removed by evaporation. As the mass approaches dryness the sodium silicate tends to form a coating of a glassy nature upon the grains and particles of the ammonium nitrate which have previously crystallized, and although sodium silicate is well recognized to have adhesive properties, for some reason not known to me the sodium silicate as thus separated as a coating upon the grains and particles of the ammonium nitrate possesses very little tendency to adhere or stick to like surfaces. Since the ammonium nitrate is separated from the ammonium nitrate of an adjacent particle by two walls of sodium silicate, the recrystallization which is the primary cause of the "caking" and "setting" of ammonium nitrate is prevented from extending from one particle to another, although having full opportunity to rearrange or recrystallize within each individual coated particle or granule. Accordingly, ammonium nitrate prepared in accordance with my present invention is free to undergo such inter-crystalline changes as are well known to occur at certain transition points, but these inter-crystalline changes are prevented from extending outside of the boundaries of the individual coated particles which form the product of the application of my invention.

I have found that the use of as little as one-tenth of one percent of sodium silicate produces a very noticeable reduction in the tendency of ammonium nitrate to "cake" or "set", and I may employ as much as five percent of sodium silicate where it is desired to obtain ammonium nitrate possessing very great anti-setting characteristics. Although I prefer to employ commercial sodium silicate in the form of a 50% solution in water, as indicated in the above example, it is not necessary that this should be employed in this particular concentration. Commercial brands of sodium silicate in their full strength may be employed with equal success, or very dilute solutions of sodium silicate may be employed, the disadvantage of employing dilute solutions of sodium silicate being the necessity of later evaporating the excess water which is thus added.

By commercial sodium silicate as used in this application is meant an aqueous solution of a silicate of soda of the type commerically available containing usually from 6% to 10% of sodium oxide and from 24% to 30% of silicon dioxide and from 60% to 70% of water and having a density of from 30° Bé to 45° Bé. When such a solution of sodium silicate is diluted with water to form a 50% solution, this solution contains from 3% to 5% of sodium oxide and from 12% to 15% of silicon dioxide, and from 80% to 85% of water.

Instead of employing a solution of sodium silicate alone, I have discovered that other materials may be added to the solution of sodium silicate, and that such additional materials may under certain circumstances increase the efficiency of the sodium silicate in imparting anti-setting characteristics to the ammonium nitrate. These additional agents form no part of my present invention, however, although they may conveniently be employed in conjunction therewith, and my present invention relates to the use of sodium silicate either alone or as one constituent in a mixture of materials, as a means of imparting to solid pulverulent or crystalline ammonium nitrate a materially reduced tendency to solidify, harden or set as a result of changes due to normal storage or due to increased conditions of moisture content, temperature change or pressure.

Although the tendency to "cake" or "set" is particularly pronounced in the case of ammonium nitrate, many other salts show this same tendency to some extent, either as a result of recrystallization due to change of crystalline form or as a result of recrystallization due to interactions between the salt and small amounts of moisture which are present. In the case of ammonium nitrate it has been found that the material may "cake" or "set" in the absence of excessive moisture, as a result of inter-crystalline changes due to temperature alone, or that the material may similarly "cake" or "set" as the result of inter-crystalline changes due to moisture alone, when the temperature is carefully maintained within a range intermediate between the transition points of the various crystalline modifications of the material. From this it may be seen that the "caking" or "setting" of ammonium nitrate is a very complicated phenomenon, which in any particular case may depend mainly upon moisture content alone or on temperature alone, but which in most cases is a result of a composite action of both temperature and moisture content.

Although I do not wish to be bound by any particular theory in explaining the efficiency in preventing the "setting" or "caking" of salts which is obtained by the application of my present invention, it is my belief that this action is more than a physical action involving the coating of the particles of ammonium nitrate by sodium silicate. When using ammonium nitrate as the salt which is treated, I have noted the evolution of small amounts of free ammonia gas during the evaporation of the solution and have found evidence of a combination of part of the sodium originally present in the sodium silicate as sodium nitrate in the finished pulverulent material, thus indicating a chemical reaction, in part at least, between ammonium nitrate and sodium silicate with the evolution of free ammonia gas, the formation of sodium nitrate and the separation of silicon dioxide, and accordingly it is possible that the presence of colloidal silicon dioxide in the coating layer plays some part in the efficiency of my present process.

Although my invention is of particular value in the treatment of ammonium nitrate, because this material is very susceptible to "caking" or "setting", and is widely used in industries in which "caking" or "setting" are disadvantageous, my invention is not limited to the treatment of ammonium nitrate, but may be generally applied to the treatment of the other ammonium salts. I have found, for example, that by following the exact treatment as herein described for the treatment of ammonium nitrate in the treatment of ammonium sulfate and ammonium chloride I am able to obtain these two materials in condition in which they also show materially reduced tendency to "cake" or "set", and I have found that my present invention is broadly applicable in the treatment of all ammonium salts. I have also discovered that by evaporating other chemical salts than ammonium salts with sodium silicate I am able to obtain compounds of somewhat reduced anti-setting characteristics, although these salts do not show the exceptionally high anti-setting characteristics which are obtained by the treatment of ammonium salts by my present invention. It is my belief that although sodium silicate may be used to advantage in reducing the tendency of other chemical salts to "cake" or "set", there is a specific action in the case of ammonium salts, which arises from the reaction which occurs between ammonium salts and sodium silicate when both are evaporated together in the form of an aqueous solution, and I have found that my present invention gives notably more satisfactory results in the treatment of ammonium salts than it does in the treatment of the salts of other metals such as metals of the alkali and alkali-earth groups, for example.

As it will be evident that many modifications may be made without departing from the essential elements of the disclosure as herein made, no limitations should be placed upon my invention except such as are indicated in the appended claims.

I claim:

1. The process of treating solutions of ammonium salts which comprises removing water from such solutions in the presence of an aqueous solution of sodium silicate until a substantially dry pulverulent mass results.

2. The process of treating ammonium nitrate solutions which comprises removing water from such solutions in the presence of an aqueous solution of sodium silicate until a substantially dry pulverulent mass results.

3. The process of preparing solid pulverulent ammonium nitrate which comprises evaporating and stirring a solution of ammonium nitrate containing sodium silicate until a solid pulverulent mass is produced.

4. The process of preparing solid pulverulent ammonium nitrate which comprises evaporating a solution of ammonium nitrate containing an amount of sodium silicate not less than one-tenth of one percent of the amount of ammonium nitrate present in the solution and containing an amount of sodium silicate not greater than five percent of the amount of ammonium nitrate present in the solution, until a solid pulverulent mass is obtained.

JOSEPH A. WYLER.